US006379482B1

(12) United States Patent
Nakayasu et al.

(10) Patent No.: US 6,379,482 B1
(45) Date of Patent: Apr. 30, 2002

(54) MANUFACTURING DEVICE AND METHOD OF THE EXPOSURE DEVICE

(75) Inventors: Hirofumi Nakayasu; Youji Houki; Yoshihiko Taira; Tsutomu Nagatomi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 09/580,876

(22) Filed: May 30, 2000

(30) Foreign Application Priority Data

Oct. 22, 1999 (JP) .......................................... 11-300663

(51) Int. Cl.[7] ................................................ B32B 31/00

(52) U.S. Cl. .......................... 156/64; 156/350; 156/362

(58) Field of Search .......................... 156/64, 350, 362; 430/31, 108.6, 120

(56) References Cited

U.S. PATENT DOCUMENTS 2,297,691 A * 10/1942 Carlson ....................... 430/55
5,863,695 A * 1/1999 Tanikawa et al. ........... 430/126
6,016,414 A * 1/2000 Anayama et al. ........... 399/159
6,156,471 A * 12/2000 Kobori et al. .............. 430/110
6,159,648 A * 12/2000 Baba et al. .............. 430/106.6

FOREIGN PATENT DOCUMENTS

JP 9-52385 2/1997

* cited by examiner

*Primary Examiner*—James Sells
(74) *Attorney, Agent, or Firm*—Armstrong, Westerman & Hattori, LLP

(57) ABSTRACT

It is an exemplified object of the present invention to provide a manufacturing device and method that can manufacture a high-performance exposure device in a short time. To achieve this object, the manufacturing method of the exposure device is configured to have its part detachable from its main body. This may allow, for instance, a holding member that holds the exposure device after a bonding step of the exposure device is finished while an adhesive is being cured, to be detached from the manufacturing device and to attach another holding member to the manufacturing device to continue the manufacturing process up to a bonding step, thereby reducing or eliminating a downtime of the device.

19 Claims, 14 Drawing Sheets

MANUFACTURING DEVICE AND METHOD OF THE EXPOSURE DEVICE

BACKGROUND OF THE INVENTION

The present invention relates generally to exposure devices, and more particularly to a manufacturing device and method of the exposure device. The present invention is suitable, for example, for a manufacturing device and method of an exposure device for use with an electrophotographic recording device. The "electrophotographic recording device" by which we mean is a recording device employing the Carlson process described in U.S. Pat. No. 2,297,691, as typified by a laser printer, and denotes a nonimpact image-forming device that provides recording by depositing a developer as a recording material on a recordable medium (e.g., printing paper, and OHP film). The image-forming device is a concept that broadly covers not only a discrete printer, but also various apparatuses having a recording function such as a photocopier, a facsimile unit, a computer system, word processor, and a combination machine thereof.

With the recent development of office automation, the use of electrophotographic recording devices for computer's output devices, facsimile units, photocopiers, etc. has spread steadily. The electrophotographic recording device features good operability, usability for a wide range of media, high cost efficiency, and high-quality and high-speed printability, and reduced noise in a printing operation; thus a further increase in demand will be expected in future.

The electrophotographic recording device typically includes a photosensitive drum and an exposure device, and follows a process constituting the steps of charging, exposure to light, development, transfer, and other post-processes, to form a desired image. These procedural steps of forming an image are basically followed by either a single color or multicolor electrophotographic recording device.

In a charging step, a pre-charger electrifies the photosensitive drum uniformly (e.g., at −600 V). In an exposure step, the exposure device irradiates a light on the photosensitive drum, and varies a potential on an irradiated area, for example, to −50 V or so, to form an electrostatic latent image. In a development step, a development device electrically deposits a developer onto the photosensitive drum, and visualizes an electrostatic latent image. In a transfer step, a transfer device transfers a toner image onto a recording medium by adsorbing the toner image formed on the photosensitive drum onto a sheet of printing paper by an electrostatic adsorption. In a fixing step, the fixing device fuses and fixes the toner image formed on the medium by applying heat, pressure or the like, and forms a final image on the medium. The post-processes may include charge neutralization and cleaning on the photosensitive drum from which toner has been transferred out, a collection and recycle and/or disposal of residual toner, etc.

Among the above-described devices for an image formation, the exposure device as an optical system for writing operation includes a light source and an image-forming member that directs a beam of light irradiated from the light source onto the photosensitive drum so as to form an image. The optical system for writing operation may adopt the following two methods. One is a mechanical scanning method that employs a laser as a light source, and scans by mechanically polarizing the beam of light using a variety of mirrors. The other is a solid state scanning method that employs a light-emitting device or the like as a light source, and scans by forming an array from the light source itself or a shutter provided in front of the light source, and distributing exposure data to each device. In recent years, the solid state scanning method has been in the mainstream, which employs, as a light source, an LED array having as many LED chips as recording pixels arranged in tandem, each LED chip having a plurality of LEDs. In addition, as an image-forming member for the above method, an unmagnified erect image projection lens array that projects an unmagnified erect image from the LED has been receiving attention in recent years.

The exposure device that adopts this solid state scanning method typically includes an LED array, an unmagnified erect image projection lens array, a lens array support, and a frame. Light irradiated from the LED in the LED array needs aligning with an optical axis of a lens in the unmagnified erect image projection lens array, and forming an appropriate image on the photosensitive drum. Thus, the LED array and the unmagnified erect image projection lens array are arranged to conform with the conditions. The lens array support securely supports the unmagnified erect image projection lens array, and the frame securely holds the LED array and the lens array support. The unmagnified erect image projection lens array is typically composed of a plurality of optical fibers as lenses, which are arranged in tandem. The lens array support includes a groove to which the unmagnified erect image projection lens array is to be fitted.

To manufacture this exposure device, typically, the LED array and the lens array support are fastened on the frame, and then the unmagnified erect image projection lens array is fitted and bonded to the lens array support with an adhesive. A securing process of the unmagnified erect image projection lens array, to be more specific, comprises the steps of adjusting a tilt and fitting depth of the unmagnified erect image projection lens array by controlling a manufacturing device to conform with the above conditions after fitting and before bonding with an adhesive the unmagnified erect image projection lens array to the lens array support. The manufacturing device integrally incorporates a holding member that holds the unmagnified erect image projection lens array, a plurality of CCD cameras fastened at several spots (e.g., five spots) along a top of the unmagnified erect image projection lens array, and an actuator that moves the holding member up or down and makes it tilted. The tilt and the fitting depth of the unmagnified erect image projection lens array are adjusted so as to conform with the above conditions by utilizing a plurality of the CCD cameras.

However, the aforementioned conventional manufacturing device and method of the exposure device has a number of disadvantages. First of all, an integration of the holding member, the CCD camera, and the actuator requires a long-time operation. For example, the above components of the exposure device cannot be detached from the manufacturing device until the adhesive is cured, whereby the number of the exposure devices that can be manufactured within limited time cannot be increased. Second, the actuator as conventionally provided introduces a tilt on the holding member by pivoting the same on a point of intersection of an LED-side end surface and optical axis of the lens, and the tilt brings a misalignment of the LED out of the optical axis of the lens, thereby preventing a sharply defined image from being formed, and degrading an image quality. Moreover, the conventional actuator is designed to make an adjunctive correction by a tilt on the lens to supplement a correction made by a horizontal movement of the lens, thereby making it more and more difficult to form a sharply defined image. Thirdly, The manufacturing device as conventionally provided has no means for observing a state of image formation other than where the CCD camera is placed, and thus has no chance to correct deformations of the unmagnified erect image projection lens array that would become wrenched or wavy along the length, preventing a sharply defined image from being formed, and degrading an image quality as well.

BRIEF SUMMARY OF THE INVENTION

Therefore, it is an exemplified general object of the present invention to provide a novel and useful manufacturing device and method of an exposure device, in which the above conventional disadvantages are eliminated.

Another exemplified and more specific object of the present invention is to provide a manufacturing device and method of an exposure device that can manufacture a high-performance development device in a short time.

In order to achieve the above objects, a manufacturing device of an exposure device including a light source and an unmagnified erect image projection lens array as one exemplified embodiment of the present invention comprises a first holding member that holds the light source in the exposure device, a second holding member that holds the unmagnified erect image projection lens array in the exposure device, and an actuator that is connected with the first and second holding members and moves at least one of the first and second holding members to position the unmagnified erect image projection lens array relative to the light source, wherein at least one of the first and second holding members can be attached to and detached from the actuator. In such a manufacturing method of the exposure device, at least one of the first and second holding members can be attached to and detached from the actuator while holding the light sources or the unmagnified erect image projection lens array. This would allow at least one of the holding members to be detached from the actuator and to perform in any other place processes that take much time after the unmagnified erect image projection lens array is positioned relative to the light source (e.g., a bonding step and processes thereafter), so that the manufacturing device could be used for another exposure device. In this manner, the manufacturing device can achieve a reduction of whole manufacturing time by reducing and eliminating its quiescent time.

A manufacturing device of an exposure device including a light source and an unmagnified erect image projection lens array as another exemplified embodiment of the present invention comprises a first holding member that holds the light source in the exposure device, a second holding member that holds the unmagnified erect image projection lens array in the exposure device, a correction mechanism that may displace one of the first and second holding members with respect to the other at least in three directions, and an actuator that is connected with the first and second holding members and drives the correction mechanism to position the unmagnified erect image projection lens array relative to the light source. This manufacturing device includes the correction device for displacing one of the first and second holding members with respect to the other in three dimensions, and may thus provide a higher-quality exposure device than a conventional manufacturing device that cannot displace only in two directions.

A manufacturing device of an exposure device including a light source and an unmagnified erect image projection lens array as still another exemplified embodiment of the present invention comprises a first holding member that holds the light source in the exposure device, a second holding member that holds the unmagnified erect image projection lens array in the exposure device, a correction mechanism that may displace one of the first and second holding members in a direction perpendicular to both an optical axis and longitudinal direction of the unmagnified erect image projection lens array, and an actuator that is connected with the first and second holding members and drives the correction mechanism to position the unmagnified erect image projection lens array relative to the light source. This manufacturing device can displace any one of the first and second holding member in a direction perpendicular to both an optical axis and longitudinal direction of the unmagnified erect image projection lens array, and may thus provide a higher-quality exposure device than a conventional manufacturing device.

A manufacturing method of an exposure device including a light source and an unmagnified erect image projection lens array as an exemplified embodiment of the present invention comprises the steps of providing the light source for use with the exposure device on a first holding member connected with an actuator, providing the unmagnified erect image projection lens array for use with the exposure device on a second holding member connected with the actuator, positioning the unmagnified erect image projection lens array relative to the light source by driving the actuator, bonding the unmagnified erect image projection lens array on a lens array support, and detaching at least one of the first and second holding members from the actuator. According to the present manufacturing method, any one of the first and second holding members can be detached from the actuator. Therefore, for instance, in processes after a bonding step, at least one of the holding members can be detached from the actuator, and an adhesive is dried in any other place, meanwhile manufacturing process up to the bonding step may be performed for another exposure device. In this manner, according to this manufacturing method, a downtime of the device would be reduced or eliminated, whereby whole manufacturing time would be reduced.

A manufacturing method of another exposure device including a light source and an unmagnified erect image projection lens array as an exemplified embodiment of the present invention comprises the steps of providing the light source for use with the exposure device on a first holding member connected with an actuator, providing the unmagnified erect image projection lens array for use with the exposure device on a second holding member connected with the actuator, positioning the unmagnified erect image projection lens array relative to the light source by driving the actuator in such a manner as to displace one of the first and second holding members with respect to the other at least in three directions. This manufacturing method includes the correction mechanism for displacing one of the first and second holding members with respect to the other at least in three directions, and can thus provide a higher-quality exposure device than a conventional manufacturing device that can only displace it in two directions.

Other objects and further features of the present invention will become readily apparent from the following description of the embodiments with reference to accompanying drawings.

DETAILED DESCRIPTION OF THE INVENTION

Figure 1:
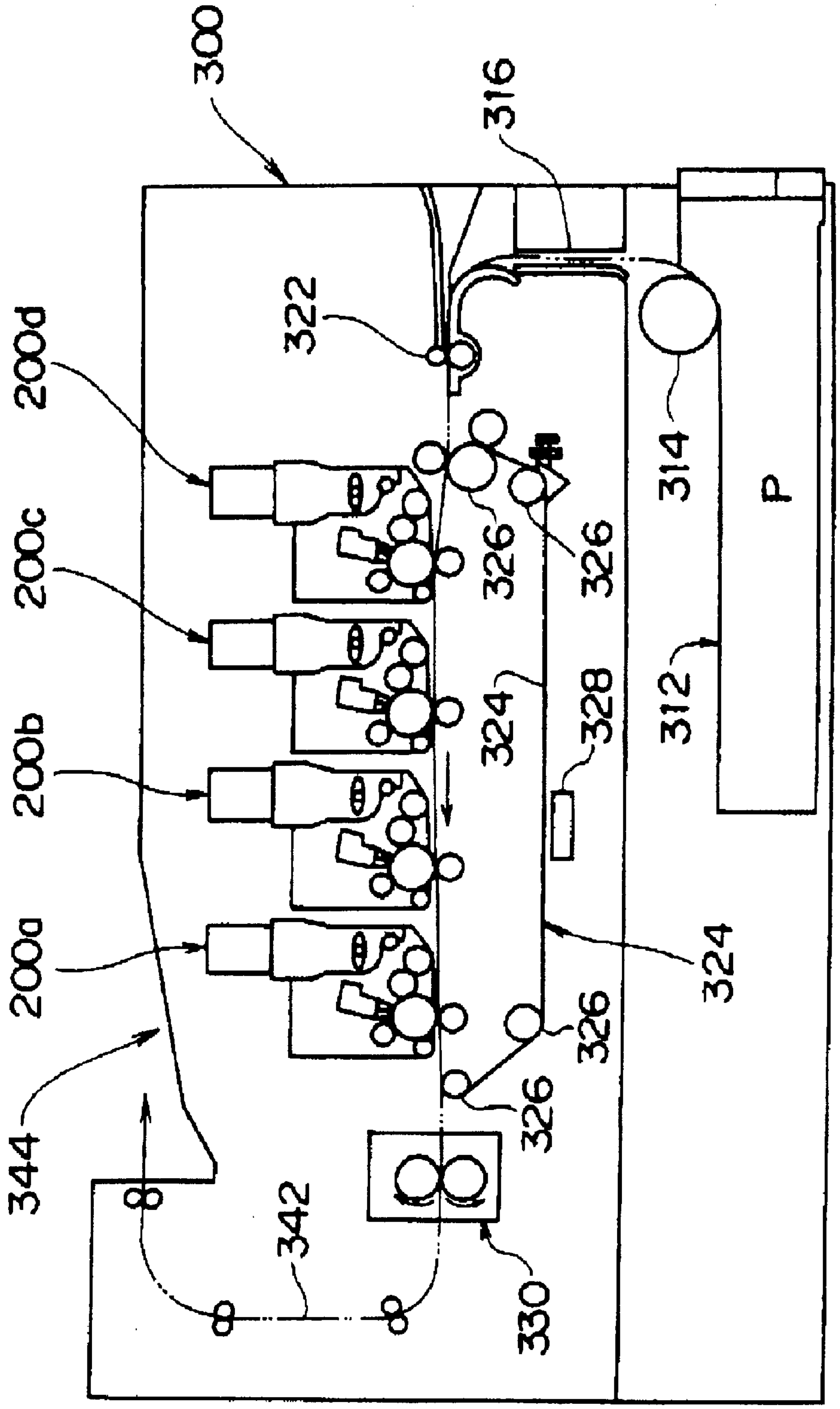
FIG. 1 is a schematic sectional view of a multicolor image-forming device to which the present invention is applicable.

A description will now be given of a structure of an image-forming device 300 having an exposure device to which the present invention is applicable, with reference to FIG. 1. In each figure, those elements designated by the same reference numerals denote the same elements, and a duplicate description thereof will be omitted. Like reference numerals with a capital alphabetic letter attached thereto generally designate a variation of the elements identified by the reference numerals, and reference numerals without an alphabetic letter, unless otherwise specified, comprehensively designate the element identified by the reference numerals with an alphabetic letter. Hereupon FIG. 1 is a schematic sectional view of a multicolor image-forming device to which the present invention is applicable. The multicolor image-forming device 300 includes a sheet-drawing section 310, a sheet conveyor section 320, four image-forming units 200a to 200d, a fixer 330, and a stacker 344. The present embodiment employs four colors of black (K), cyan (C), magenta (M), and yellow (Y), which are respectively allotted to the image-forming units 200a through 200d. It is to be understood that the number of colors in the present invention is not limited to four. In addition, the image-forming unit 200 is applicable to both of single-sided and double-sided printings.

To form a multicolor image, four-color developers for cyan (C), magenta (M), yellow (Y), and black (K) are used in general, and a full-color representation on a recording medium may be achieved by superimposing these colors. Among various methods of forming a multicolor image, two of the methods are in the main stream: a single-drum method that forms a four-color toner image on the photosensitive drum by repeating the steps of charging, exposure to light, development as many times as the number of colors (e.g., four times) on the photosensitive drum, and then fixes the image; and a tandem method that employs four image-forming units for the above four colors arranged in tandem, each performing the steps of charging, exposure to light, development, and transfer, and combines the four colors on the recording medium. The image-forming device 300 may be either multicolor or single-color.

The sheet-drawing section 310 picks up a sheet of paper P placed on the top of a hopper (or tray) 312 storing more than one sheet of printing paper, and supplies it to the sheet conveyor section 320. The sheet-drawing section 310 includes the hopper 312, a pickup roller 314, and a sheet guide 316. The hopper 312 stores more than one sheet of paper P. The pickup roller 314 is brought into contact with a sheet of paper P on the top of a stack of paper P set in the hopper 312, and dispenses the sheets one by one. The sheet guide 316 guides the paper P dispensed by the pickup roller 314 to the sheet conveyor section 320.

The sheet conveyor section 320 receives the paper P from the sheet-drawing section 310, and conveys it along a sheet conveyor path 342 to the stacker 344. The sheet conveyor section 320 includes a sheet feed roller 322, a conveyer belt 324, and a driven roller 326 that rotates the conveyor belt 324. The paper P is conveyed to the conveyor belt 324 by the sheet feed roller 322. Subsequently, the paper P is electrostatically adsorbed to the conveyor belt 324 rotating to the left (counterclockwise) in FIG. 1 by the driven roller 326, conveyed between a photosensitive drum 210 in the image-forming unit 200 and the belt 324, passing through the fixer 330, and dispensed to the stacker 344.

As shown in FIG. 1, on a bottom belt surface of the conveyor belt 324 preferably is provided a sensor 328 parallel to a belt-moving direction. The sensor optically reads a register mark on the conveyor belt 324, and detects a misalignment of the conveyor belt 324.

Figure 2:
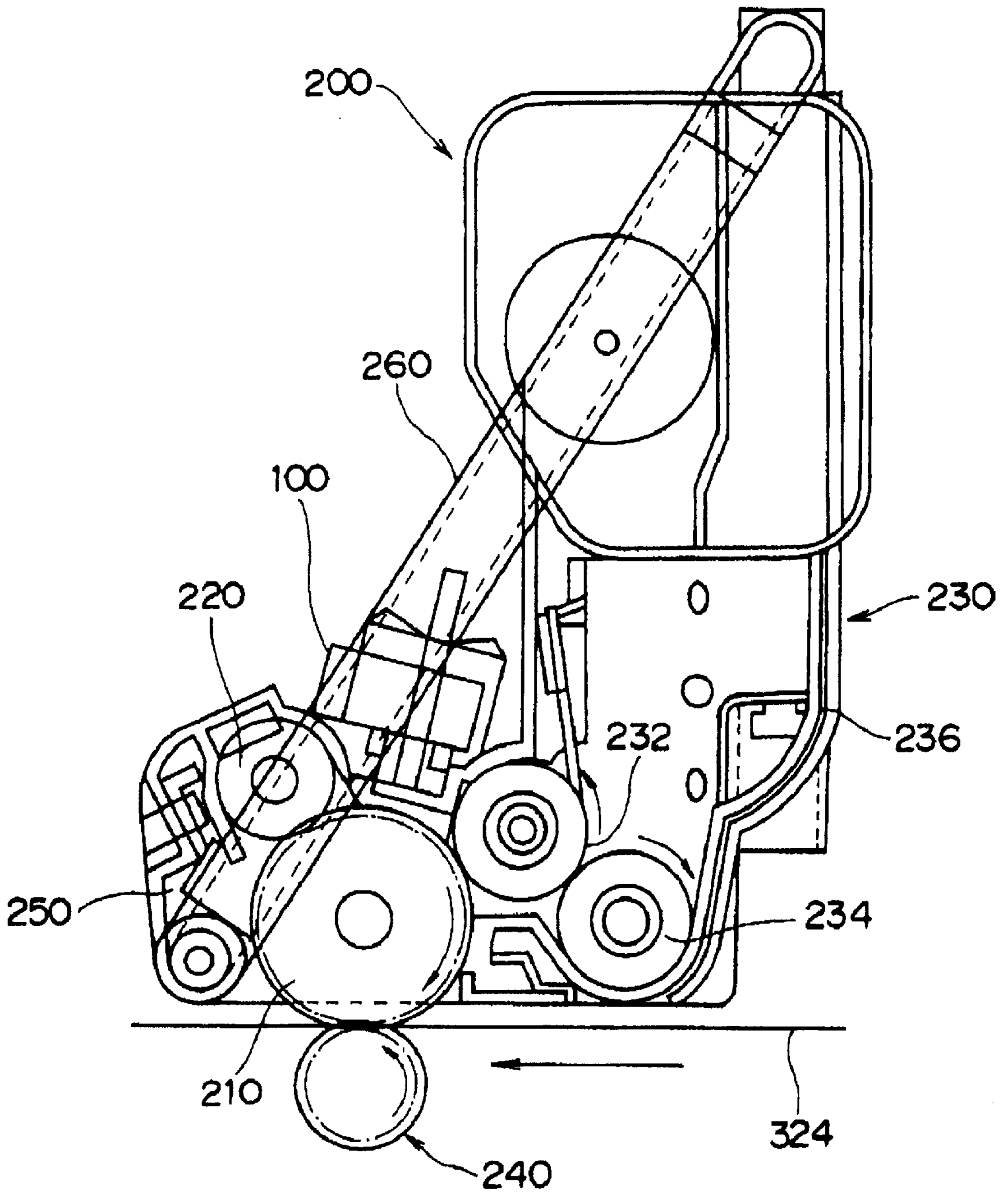
FIG. 2 is a schematic sectional view of an exemplified image-forming unit of the image-forming device shown in FIG. 1.

The image-forming unit 200 serves to form (transfer) a desired toner image on the printing paper P. As shown in FIG. 1, the four image-forming units 200a through 200d and fixer 330 are aligned in a straight line. The image-forming unit 200 is, as shown in FIG. 2, includes a photosensitive drum 210, a pre-charger 220, an exposure device 100, a development device 230, a transfer roller 240, a cleaning section 250, and a screw conveyor 260. FIG. 2 is a schematic sectional view of an exemplified image-forming unit of the image-forming device shown in FIG. 1.

The photosensitive drum 210 includes a photosensitive dielectric layer on a rotatable drum-shaped conductor support, and is used for an image holding member. The photosensitive drum 210, which is, for instance, made by applying a function separation-type organic photoreceptor with a thickness of about 20ì m on a drum-shaped aluminum member, has an outer diameter of 30 mm, and rotates at a circumferential velocity of 70 mm /s to move in the arrow direction. The charger 220 is, for instance, comprised of a scorotron-electrifying device, and gives a constant amount of electric charges (e.g., about −700 V) on the photosensitive drum 210.

Figure 3:
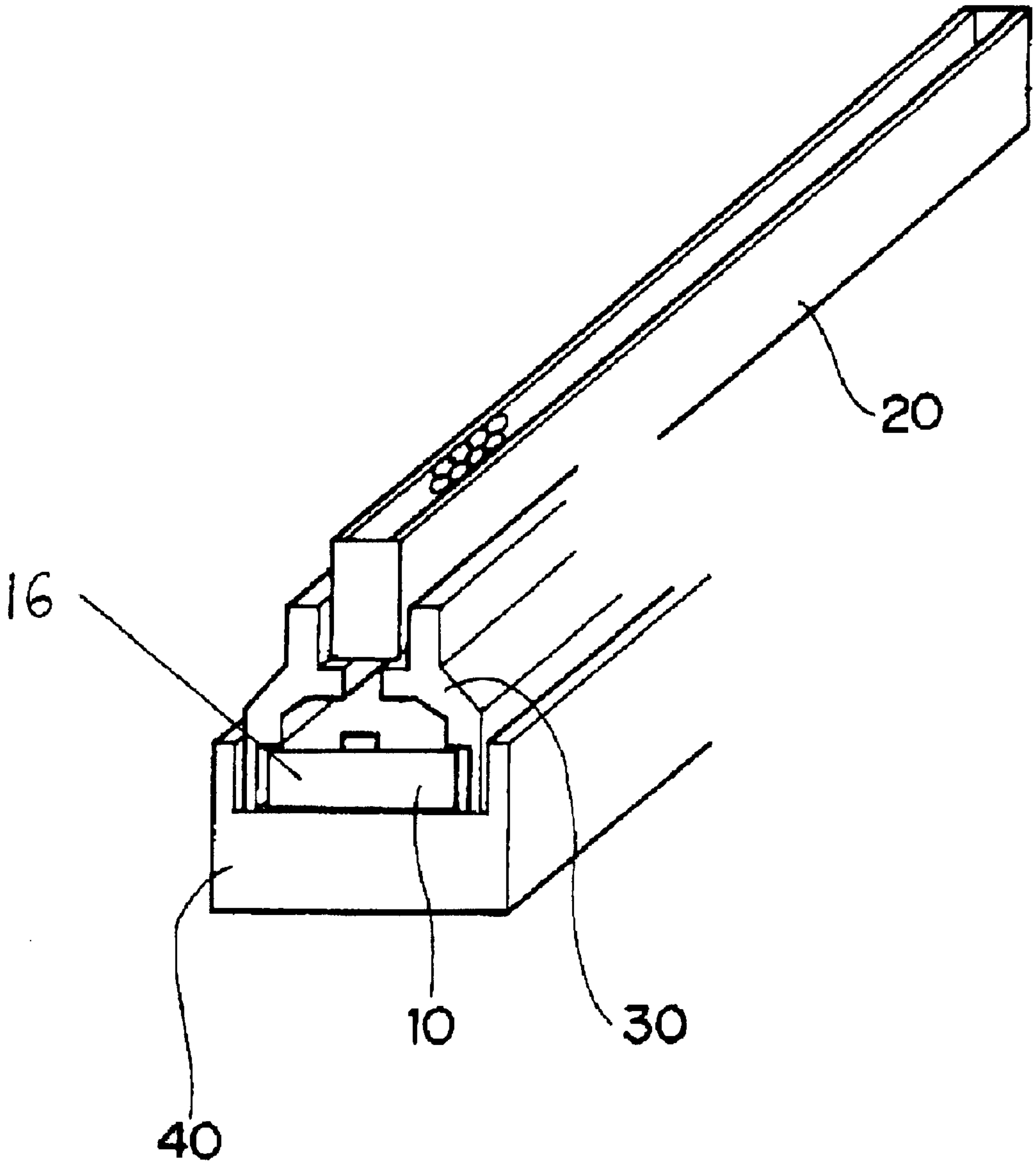
FIG. 3 is a schematic perspective view of principal part of an exposure device that adopts a solid state scanning method.
Figure 4:
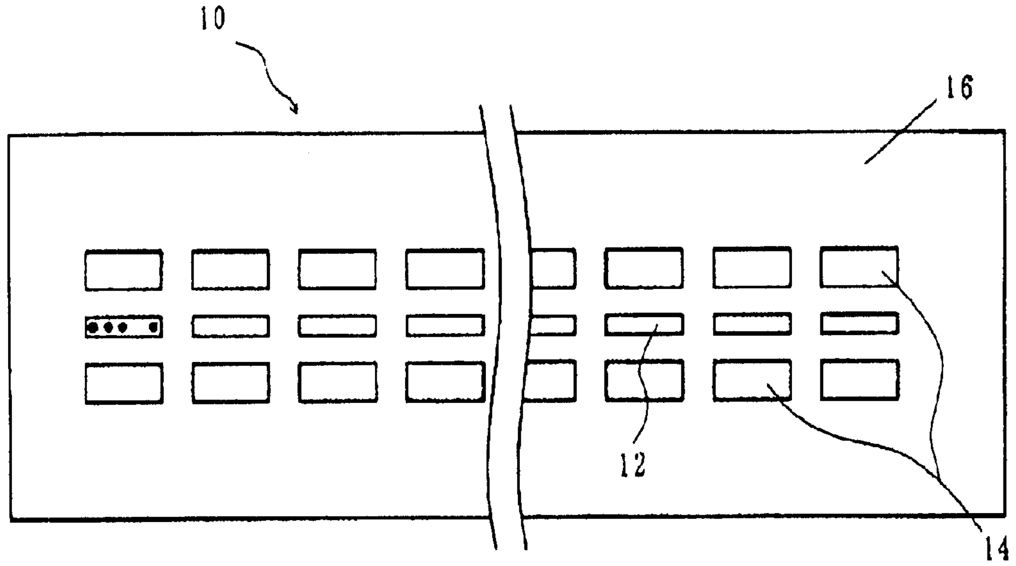
FIG. 4 is a schematic plan view of an LED array provided for the exposure device shown in FIG. 3.

The exposure device 100 forms a latent image on the photosensitive drum 210. Any exposure methods known in the art (e.g., the mechanical scanning method and solid state scanning method) can be adopted. In the present embodiment, however, the solid state scanning method that requires no movable section corresponding to a main scanning direction (a direction perpendicular to a sheet conveying direction), and has a simple mechanism is adopted. A description will now be given of a more detailed structure of the exposure device 100 that adopts the solid state scanning method, with reference to FIG. 3. FIG. 3 is a schematic perspective view of the exposure device that adopts a solid state scanning method. The exposure device 100, as shown in FIG. 3, includes an LED array 10, an unmagnified erect image projection lens array 20, a lens array support 30, and a frame 40. The LED array 10, as shown in FIG. 4, includes an LED chip 12, and a pair of driving circuits (Dr-IC) 14 that is placed so as to sandwich the LED chip 12, on a print plate 16 made, for instance, of platinum or the like. FIG. 4 is a schematic view of an LED array 10 provided in the exposure device 100. Light emitted from the LED chip 12 is directed through the unmagnified erect image projection lens array 20, and exposes the photosensitive drum 210. As the unmagnified erect image projection lens array 20 is usable a SELFOC™ Lens Array (SLA) developed by Nippon Sheet Glass Co., Ltd. This lens array 20 is a lens member storing a plurality of optical fibers that can form an unmagnified erect image.

The lens array support 30 is composed of polycarbonate as the main ingredient with 30% glass mixed therein. The lens array support 30 supports the unmagnified erect image projection lens array 20 on the top of the LED array 10, and is so arranged to efficiently direct a beam of light into the lens array 20. The frame 40 is, for instance, an aluminum stay, and includes and holds the LED array 10, the unmagnified erect image projection lens array 20, and the lens support 30.

Figure 6:
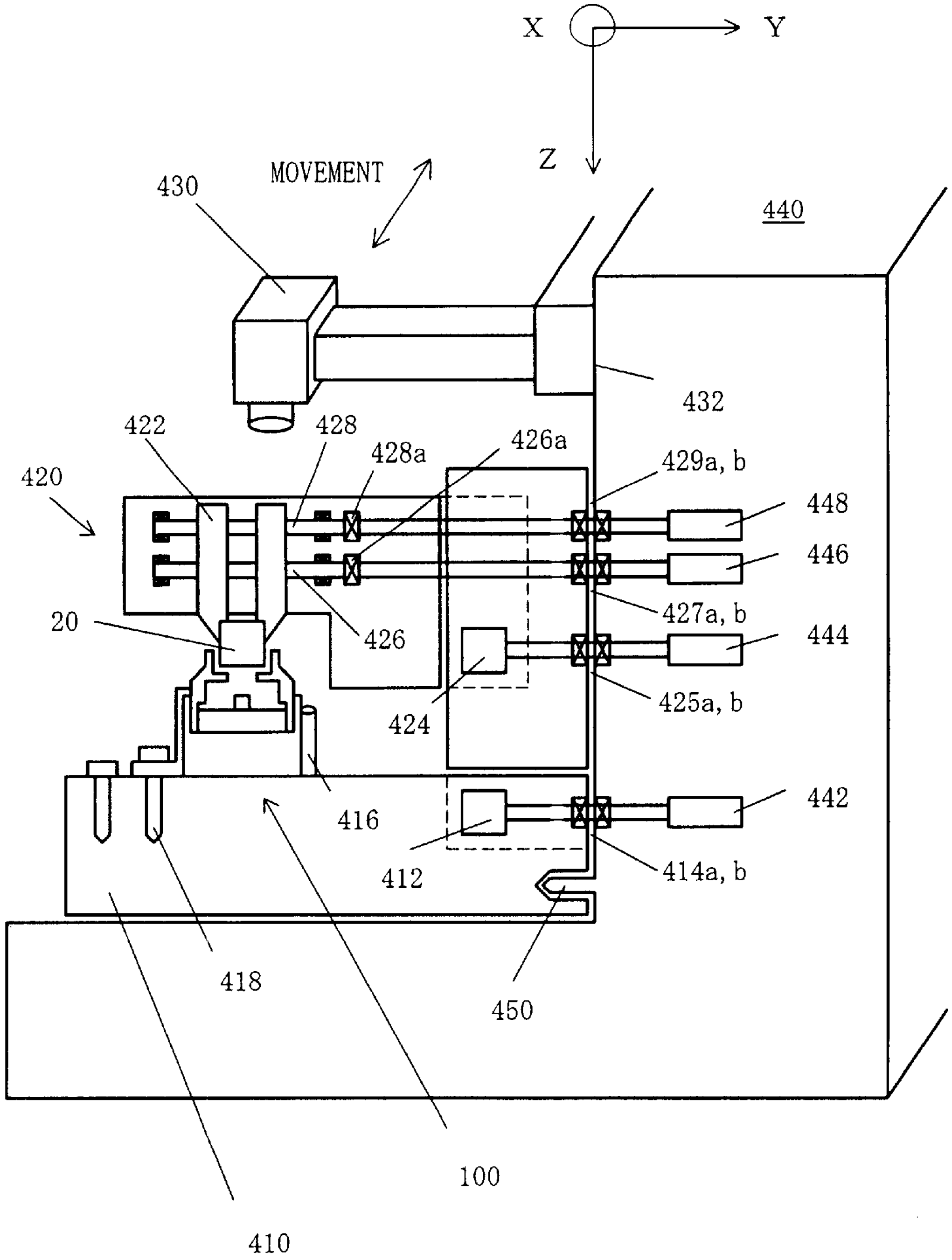
FIG. 6 is a schematic perspective view of a bonding device that determines a proper position of the unmagnified erect image projection lens array shown in FIG. 3 relative to the LED array, and bonds them.
Figure 7:
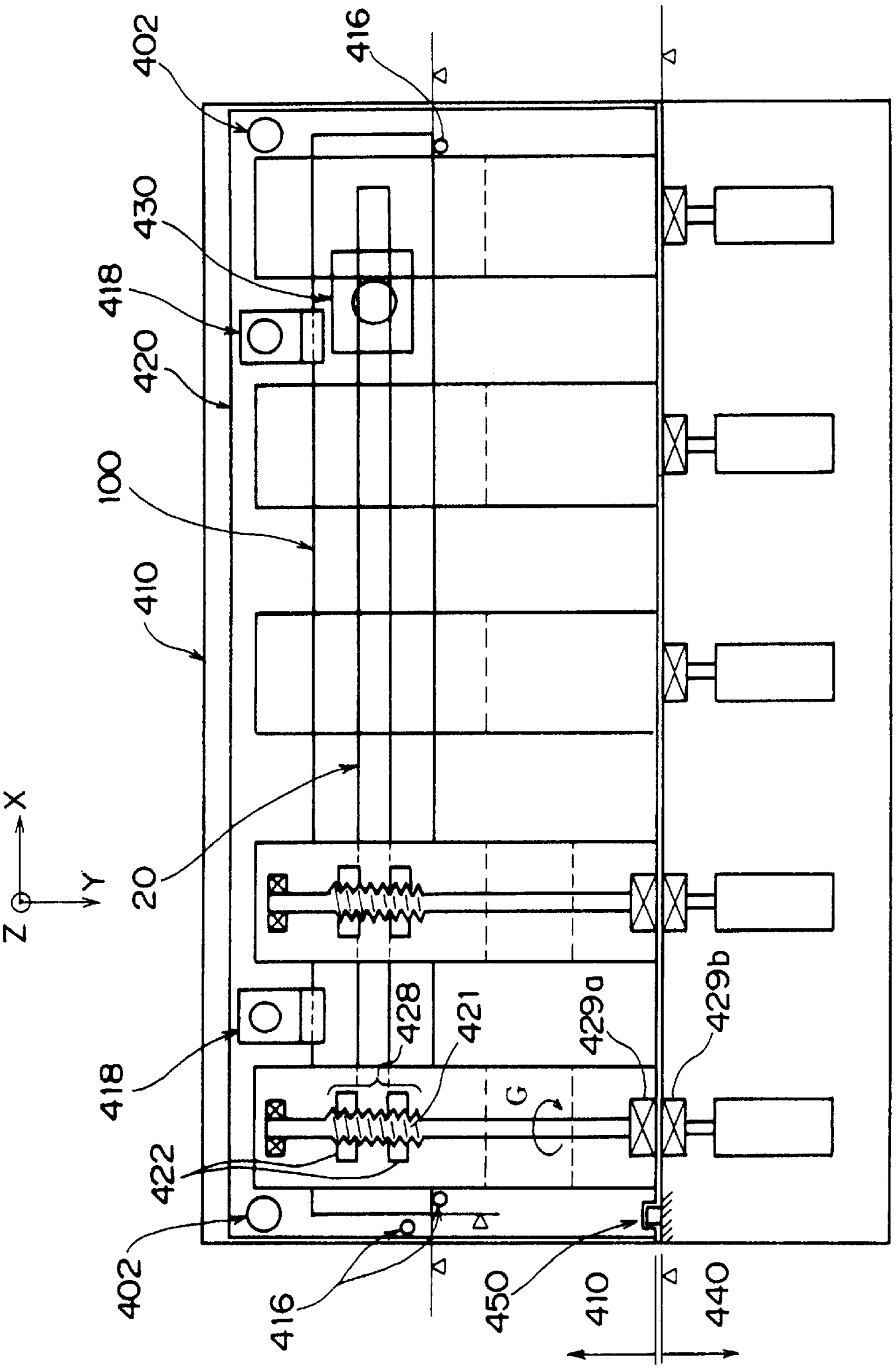
FIG. 7 is a plan view of the bonding device shown in FIG. 6
Figure 8:
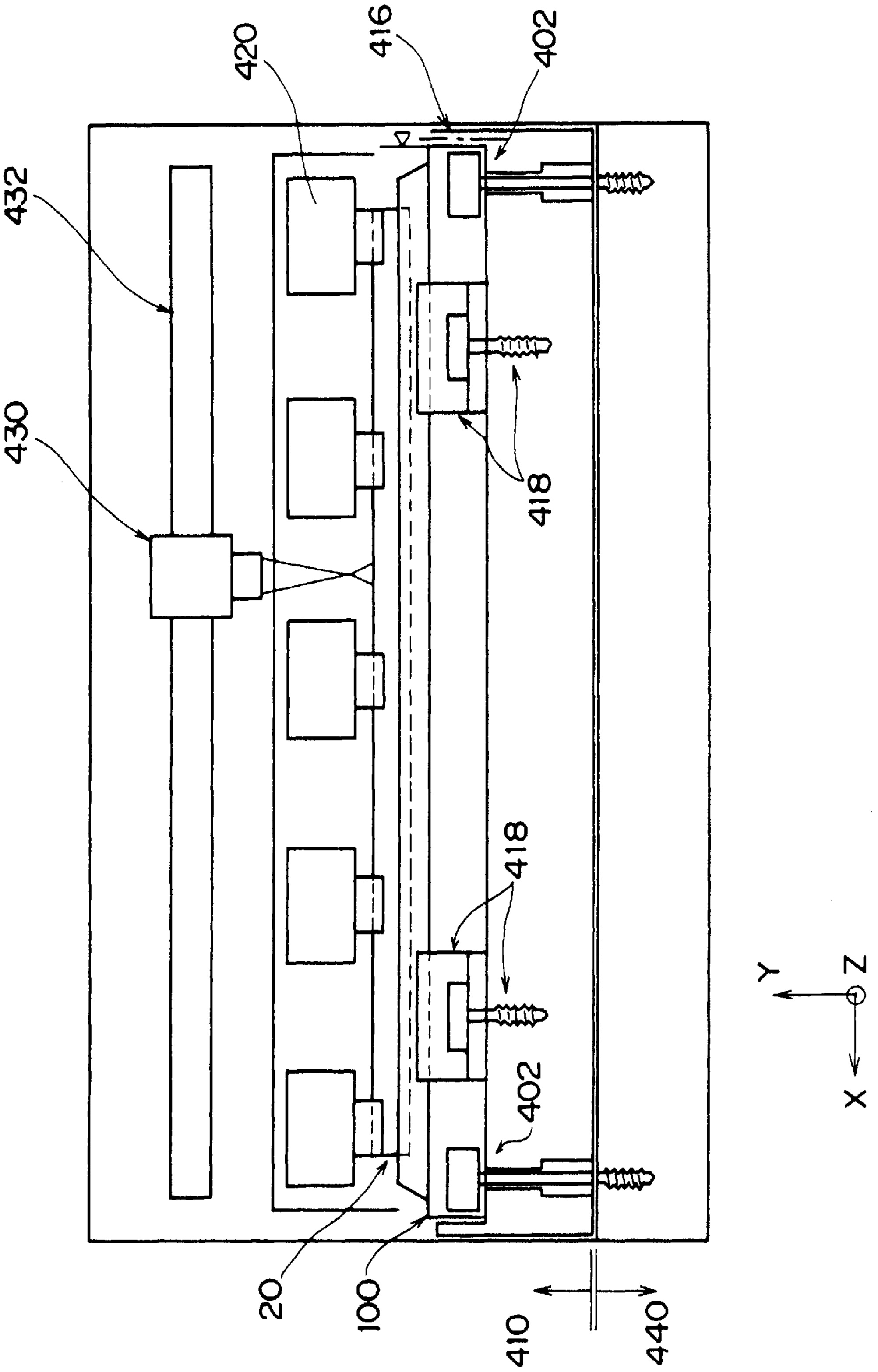
FIG. 8 is a front view of the bonding device shown in FIG. 6.
Figure 9:
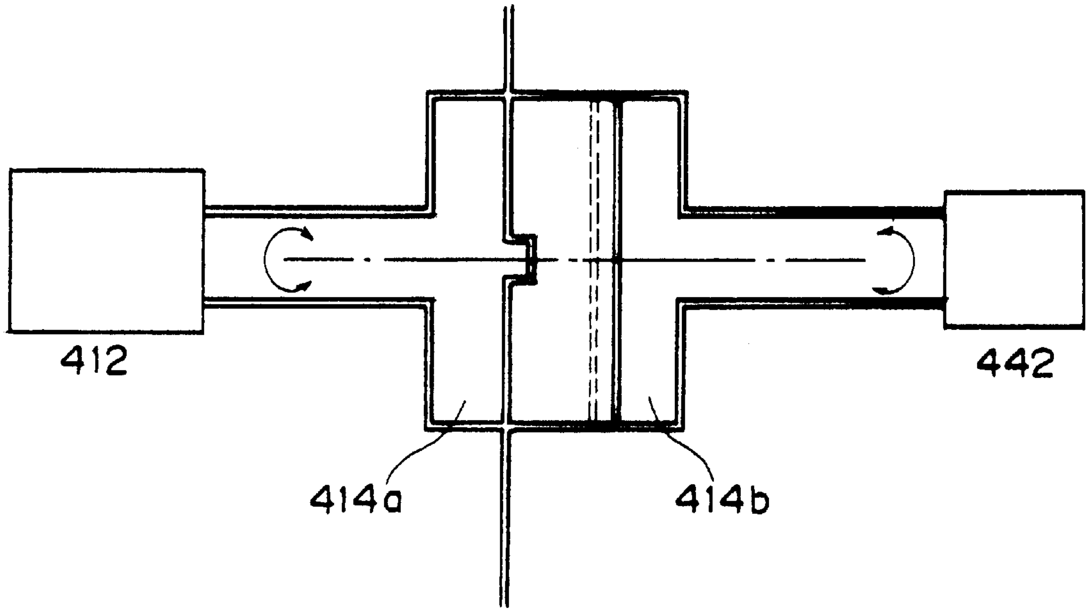
FIG. 9 is an enlarged sectional view of principal part of a joint provided in the bonding device shown in FIG. 6.
Figure 10:
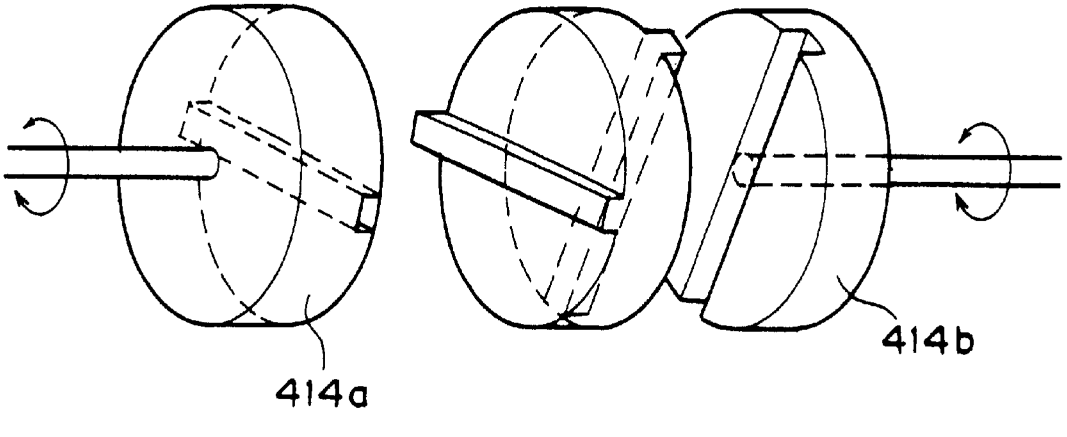
FIG. 10 is an exploded perspective view for explaining an operation of the joint shown in FIG. 9.
Figure 11:
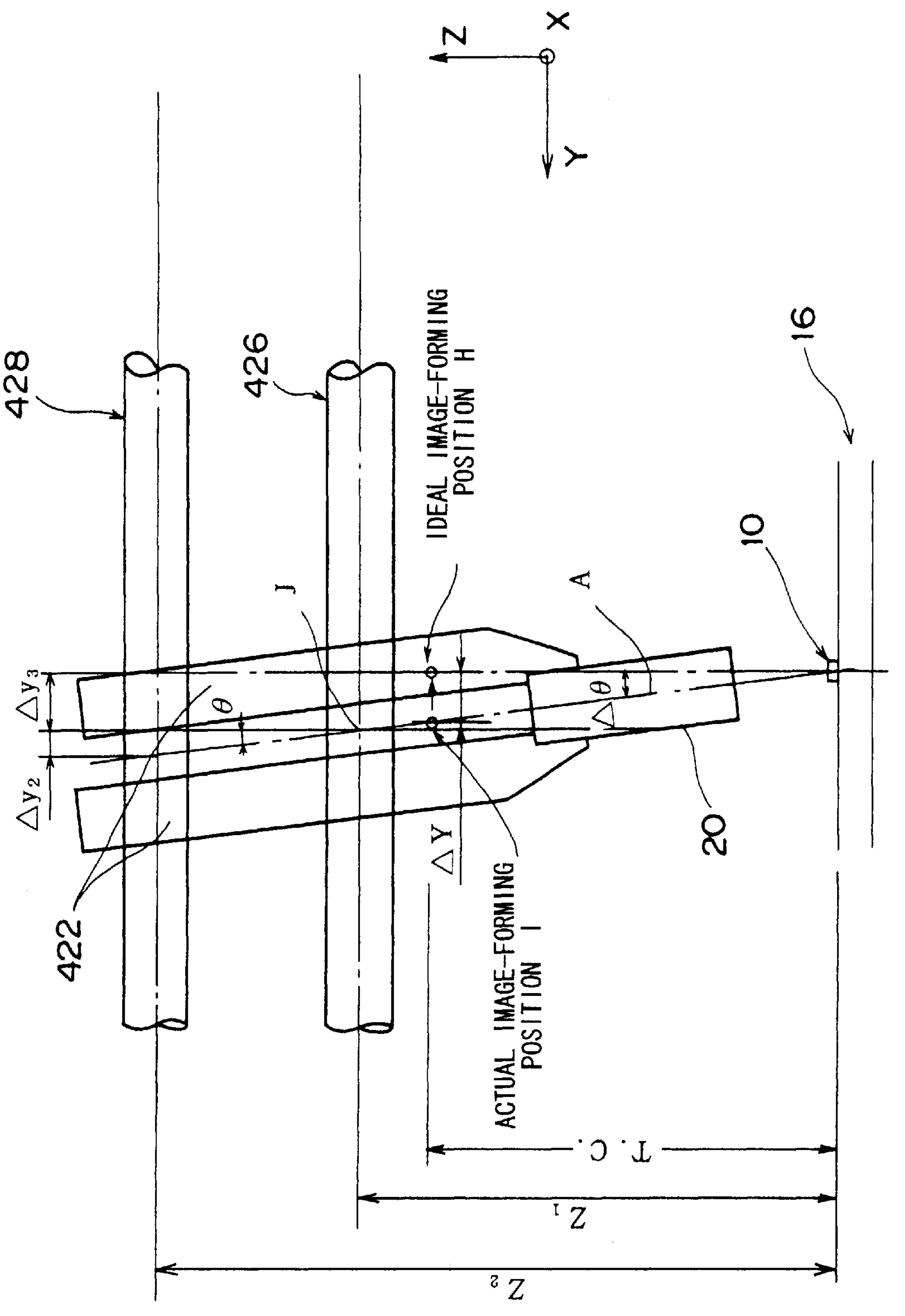
FIG. 11 is a schematic sectional view for explaining a correction of the bonding device shown in FIG. 6 in a direction Y at an angle è, and a detailed illustration of a holding mechanism for holding an unmagnified erect image projection lens array 20 when an image-forming position is displaced.
Figure 12:
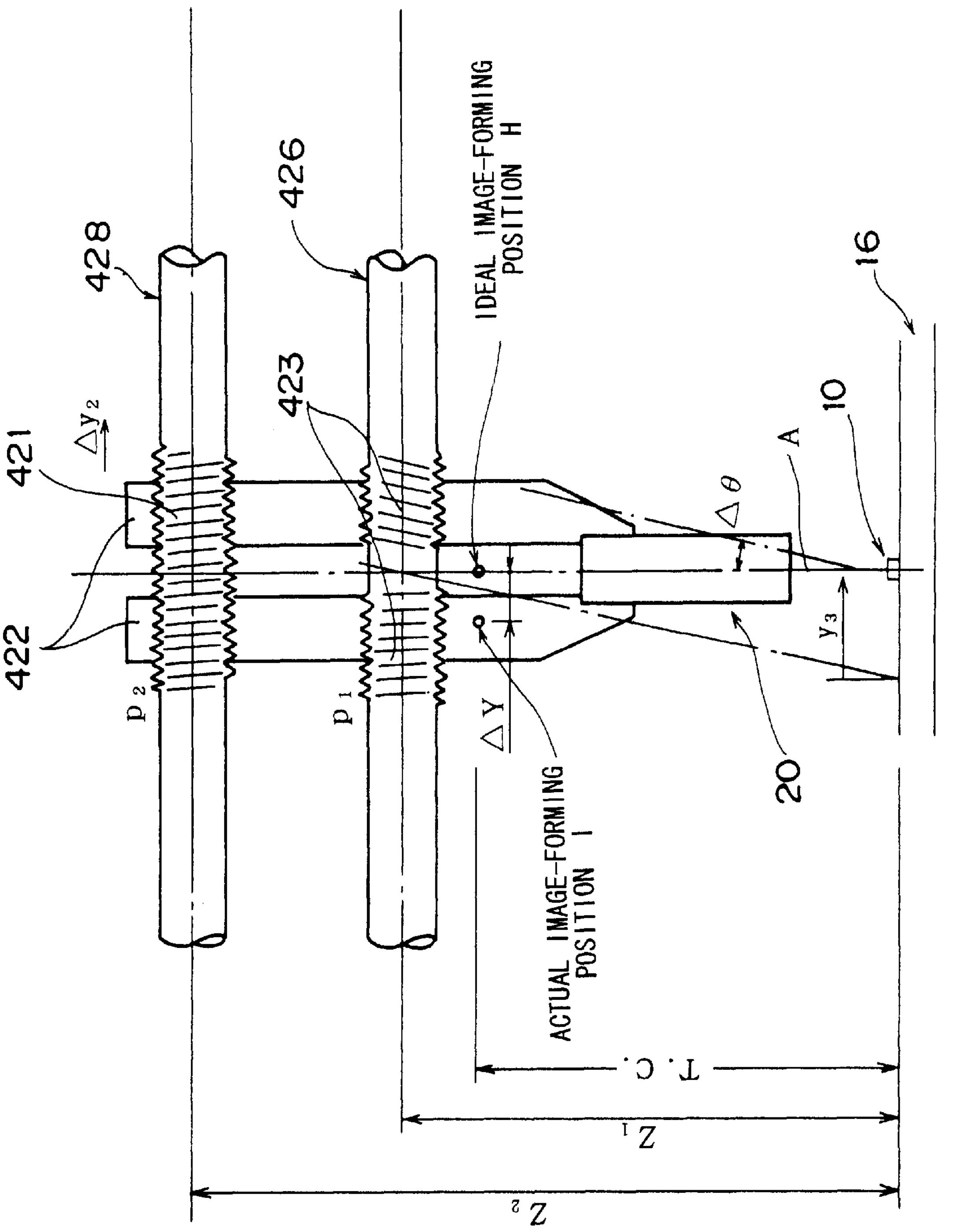
FIG. 12 is a detailed illustration of a holding mechanism for holding an unmagnified erect image projection lens array 20 when an image-forming position is properly adjusted.
Figure 13:
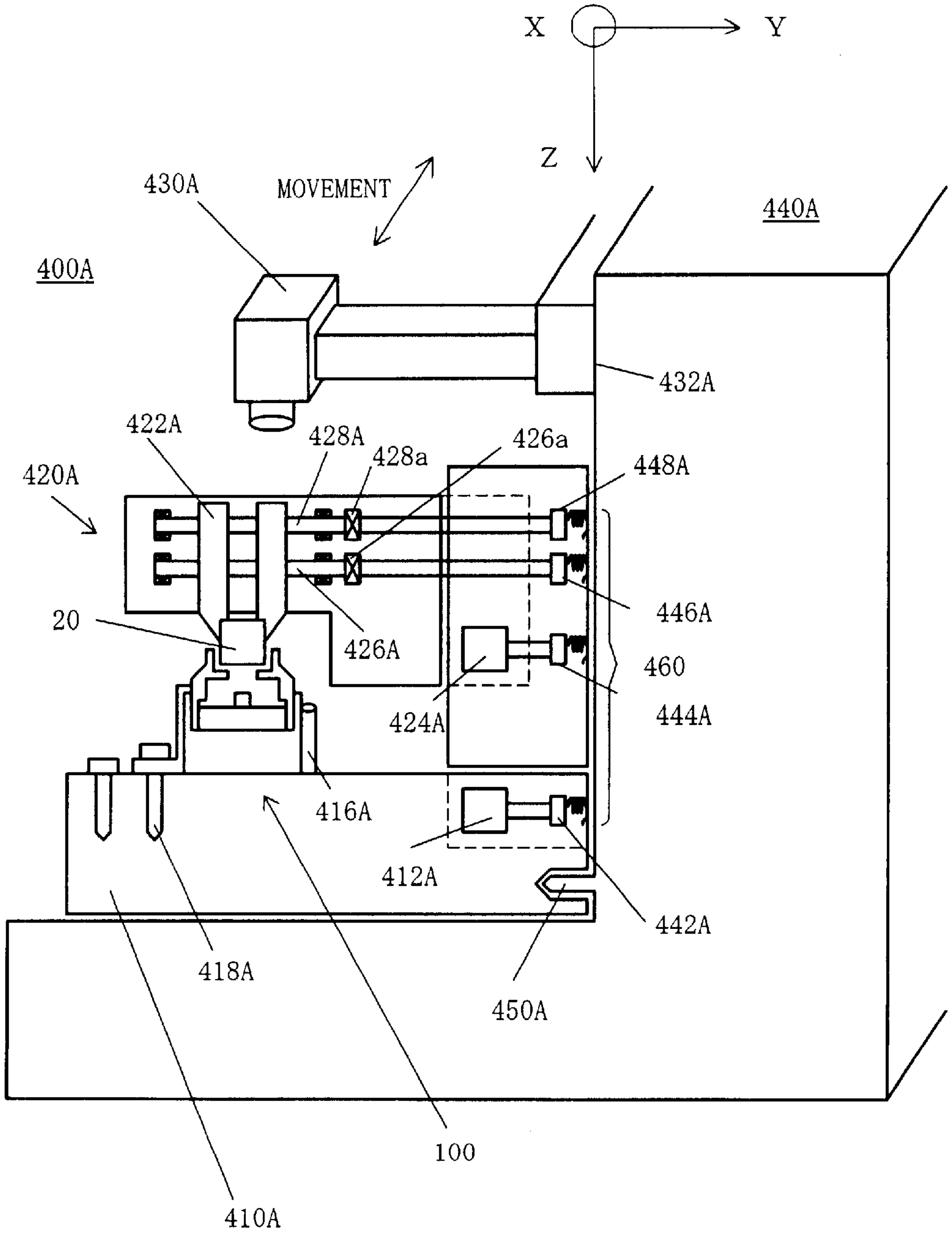
FIG. 13 is a schematic perspective view of a variation of the bonding device shown in FIG. 6.
Figure 14:
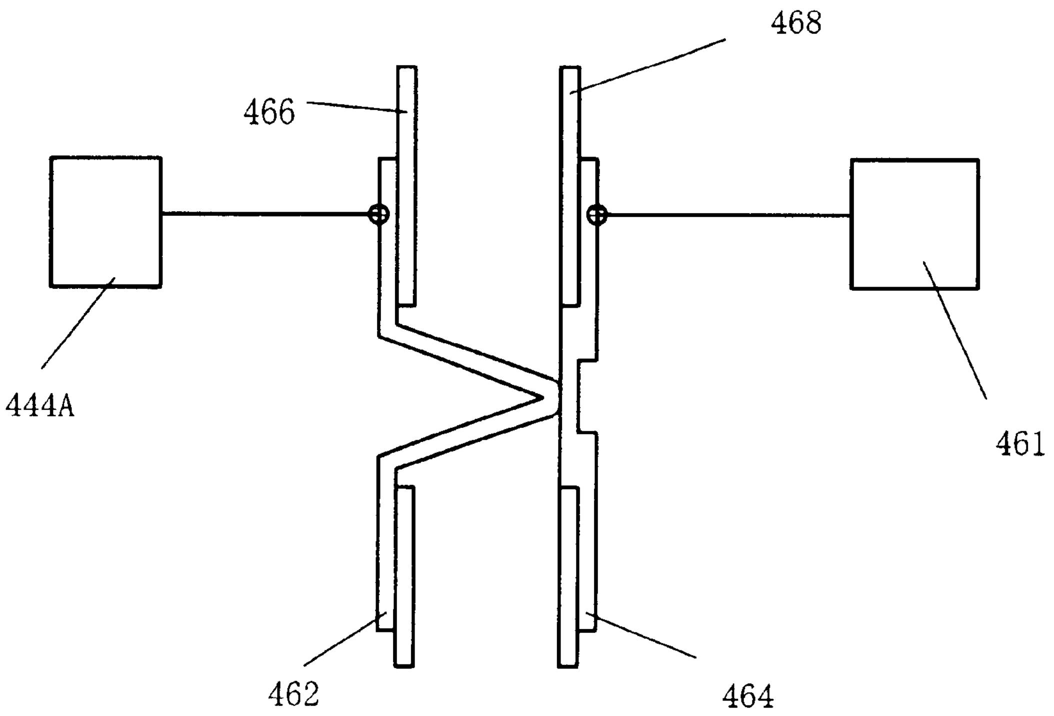
FIG. 14 is an enlarged sectional view of principal part of the bonding device shown in FIG. 13 for illustrating an electrical connection portion thereof.
Figure 15:
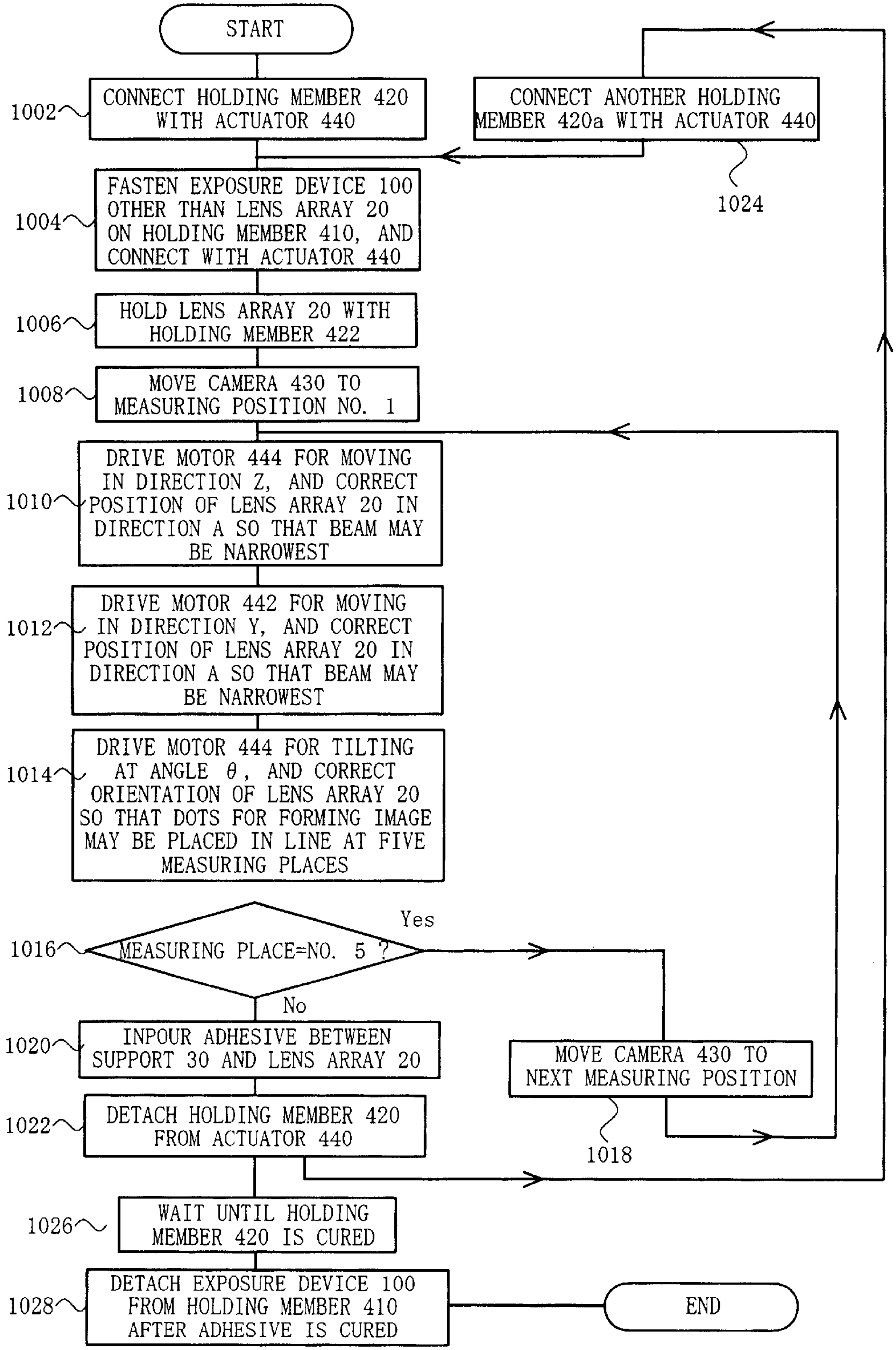
FIG. 15 is a flowchart for explaining a manufacturing process using the bonding device shown in FIGS. 6 through 13.

A description will now be given of a bonding device 400 as part of the manufacturing method used for manufacturing the exposure device 100 of the present invention with reference to FIGS. 6 through 15. FIG. 6 is a schematic perspective view of the bonding device 400 that determines a proper position of the unmagnified erect image projection lens array 20 relative to the LED array 10, and bonds them. FIG. 7 is a plan view of the inventive bonding device 400 shown in FIG. 6. FIG. 8 is a front view of the bonding device 400 shown in FIG. 6. FIG. 9 is an enlarged sectional view of principal part of a joint provided in the bonding device 400 shown in FIG. 6. FIG. 10 is an exploded perspective view for explaining an operation of the joint shown in FIG. 9. FIG. 11 is a schematic sectional view for explaining a correction of the bonding device 400 shown in FIG. 6 in a direction Y at an angle è, and a detailed illustration of a holding mechanism for holding the unmagnified erect image projection lens array 20 when an image-forming position is displaced. FIG. 12 is a detailed illustration of a holding mechanism for holding the unmagnified erect image projection lens array 20 when an image-forming position is properly adjusted. FIG. 13 is a schematic perspective view of a variation 400*a* of the bonding device shown in FIG. 6. FIG. 14 is an enlarged sectional view of principal part of the bonding device 400*a* shown in FIG. 13 for illustrating an electrical connection portion thereof. FIG. 15 is a flowchart for explaining a manufacturing process using the bonding devices 400 and 400*a* shown in FIGS. 6 through 13.

Referring now to FIG. 6, the bonding device 400 includes a holding member 410 for the exposure device 100 other than the unmagnified erect image projection lens array 20, a holding member 420 for the unmagnified erect image projection lens array 20, an CCD camera 430, an actuator 440, and a positioning member 450 between the holding member 410 and the actuator 440.

The holding member 410 holds the exposure device 100 other than the lens array 20, and is connected with the actuator 440. The holding member 410 is connected with a moving mechanism 412 that moves the holding member 410 in the direction Y, and includes a joint 414a, a gauge pin 416, and a fastening member 418. The exposure device 100 other than the lens array 20 is located in a fastening place positioned by the gauge pin 416, and connected with and fastened on the actuator 440 by the fastening member 418 using screws.

The moving mechanism 412 start moving by coupling joints 414*b* and 414*a* to transmit a power of a motor 442 in the actuator 440. The moving mechanism 412 includes a screw structure, and can convert a rotary motion into a rectilinear motion. Accordingly, the rotary motion by the motor 442 becomes the rectilinear motion in the direction Y, and can move the exposure device 100 other than the unmagnified erect image projection lens array 20 at a desired distance. The moving mechanism 412 and the holding member 410 connected therewith may move to the left in FIG. 6 when an axis of rotation (not shown) turns clockwise, and to the right in FIG. 6 when it turns counterclockwise.

The holding member 420 holds the unmagnified erect image lens array 20, and is connected with the actuator 440. The holding member 420 includes a holding portion 422 and a holding mechanism 426, and is connected with a moving mechanism 424 that moves the holding member 420 in the direction Z, a moving mechanism 428 that moves the holding member 420 in the direction Y (so as to tilt the lens array 20 at an angle è), and joints 425*a* through 429*a*. The holding portion 422 holds by sandwiching the unmagnified erect image projection lens array 20 with two members by a power applied by the holding mechanism 426. In FIG. 6, members indicated by 428*a* and 426*a* are, for instance, comprised of a universal joint.

The moving mechanism 424, for instance, comprises a rack and a pinion, and converts a rotary motion into an up-or-down motion. The moving mechanism 424 starts moving by coupling joints 425*b* and 425*a* to transmit a power of a motor 444. As a result, the moving mechanism 424 may move the holding member 420 by the power of the driving source at a desired distance in the direction Z. The moving mechanism 424 and the holding member 420 connected therewith may move upward in FIG. 6 when an axis of rotation (not shown) turns clockwise, and downward in FIG. 6 when it turns counterclockwise.

The holding mechanism 426 may widen or narrow the space between the members of the holding portion 422. The moving mechanism 428, which is connected with the holding portion 422, may tilt the lens array 20 in the direction Y at an angle è by moving only the top portion of the holding portion 422 in the direction Y. The holding mechanism 426 and the moving mechanism 428 also starts moving by initiating transmissions of powers of motors 446 and 448 through joints 427 and 429 respectively in the same manner as described above. The holding mechanism 426 includes a rotary member 423 having a screw structure, and may move, for example, to narrow the space between the members of the holding portion 422 when a rotary axis (not shown) turns clockwise, or to widen the same when it turns counterclockwise. The moving mechanism 428 may move, like the moving mechanism 412, may move, for instance, to the left in FIG. 6 when an axis of rotation turns clockwise, and to the right in FIG. 6 when it turns counterclockwise.

Referring now to FIG. 7, an internal structure and mechanism for movement in the moving mechanism 428 is illustrated. FIG. 7 is a plan viewed from the top in the direction Z of FIG. 6. The moving mechanism 428 includes a rotary member 421 having a screw structure. When the rotary member 421 turns in a direction indicated by an arrow G (i.e., clockwise), it moves away from the driving source (i.e., in the direction Y) as a screw does While being fastened. On the other hand, when it turns in the opposite direction, it moves in the opposite direction. Consequently, the bonding device 400 may tilt the unmagnified erect image projection lens array 20 at an angle è. In the present embodiment, such è-angular correction members are provided in five places as shown in FIG. 7.

Referring to FIGS. 7 and 8, a description will be given of a method of fastening the exposure device 100 other than the lens array 20 and the holding member 410, and a method of fastening the holding member 410 and the actuator 440. FIG. 8 is a plan viewed from the left in the direction Y of FIG. 6. As shown in FIGS. 7 and 8, the bonding device 400 includes the gauge pin 416 for the exposure device 100 other than the lens array 20, the fastening member 418 of the exposure device 100 and the holding member 410, and the fastening member 402 of the holding member 410 and the actuator 440.

The exposure device 100 other than the unmagnified erect image projection lens array 20 is guided to a desired position by the gauge pin 416. The exposure device 100 is fastened to the holding member 410 by the fastening member 418 comprised of a screw and metal fittings. Thereafter, the holding member 410, using the positioning member 450 as will be described later, determines a position in which to be fastened, and then is fastened to the actuator 440 by the fastening member 402.

Each joint 414*a,* and 425*a* through 429*a* transmits power into the holding members 410 and 420. A detailed description will be given of a structure and operation of the joints 414, and 425 through 429 used in the present embodiment, with reference to FIGS. 9 and 10. FIG. 9 is an enlarged view of the joints 414*a* and 414*b*. The present embodiment exemplarily adopts an Oldham's coupling as the joints 414*a* and 414*b,* in which the joint 414*a* has a cylindrical body with a convex column, and the joint 414*b* has a cylindrical body with a concave column. As shown in FIG. 10, a power is transmitted through engagement of their convex and concave portions. Accordingly, the moving mechanism 412 rotates in the same direction as the motor 442 rotates. Unless the joints 414*a* and 414*b* are in contact with each other, the power is not transmitted. Thus, the joints enable an attachment and detachment between the holding member 410 and the actuator 440, and between the holding member 420 and the actuator 440.

The CCD camera is used for observing a state as to how the unmagnified erect image projection lens array 20 is forming an image. The CCD camera 430, even among the same models, may generally have a variation due to a manufacturing error. The manufacturing error affects product's property such as sensitivity and linearity and gives the product its individuality. Therefore use of a plurality of the CCD cameras may influence an accuracy of the observation of the state of the image formation. In the present embodiment, the bonding device 400 includes a single CCD camera 430, which may move in the direction X. Thus the observation becomes possible anywhere along a line parallel to the X-axis without fear of varied qualities due to the manufacturing error. This embodiment employs only a single CCD camera, and thus also has a huge cost advantage in preparing the manufacturing device over that which employs a plurality of CCD cameras.

The actuator 440 is a member for correcting a displacement of image formation that is determined through the CCD camera 430. As shown in FIG. 6, the actuator includes the motors 442 through 448, and the joints 414*b* and 425*b* through 429*b*. Since any techniques regarding the motors 442 through 448 are known in the arts, a specific description will be omitted. Further, a description regarding the joints 414*b* and 425*b* through 429*b* would overlap the above discussion, and thus will be omitted. To illustrate an action thereof, powers generated by the motors 442 through 448 are converted into powers to move in the directions Y, Z, or to tilt at an angle è, or to narrow or widen the holding portion, and thus can correct the displacement of image formation.

The positioning member 450 includes, as shown in FIG. 6, a convex portion 450*a* provided in the actuator 440, and a concave portion 450*b* provided in the holding member 410. Mating of the convex and concave portions completes the positioning, and thereafter the holding member 410 is fastened to the actuator by the fastening member 402.

Figure 5:
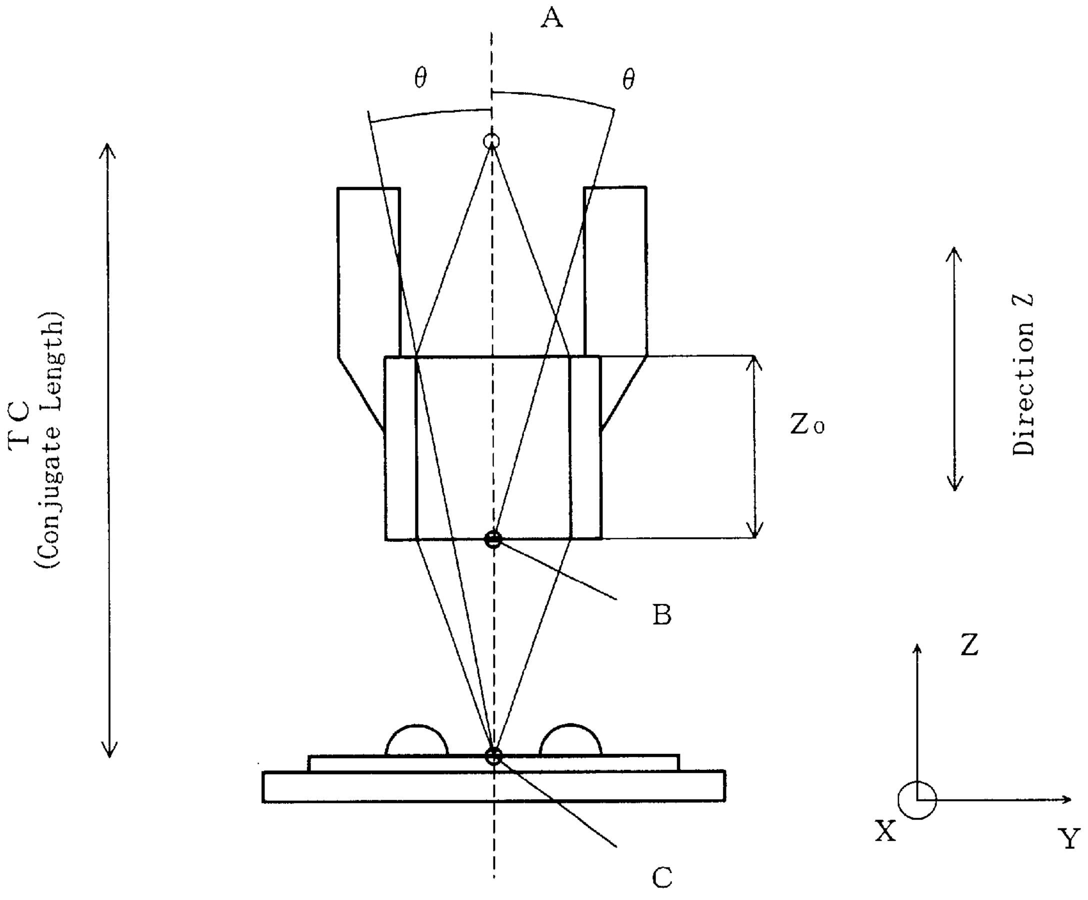
FIG. 5 is a schematic sectional view for illustrating a relative position of an LED array and unmagnified erect image projection lens array shown in FIG. 3.

A detailed description will be given of the è-angular correction according to the inventive bonding device 400, with reference to FIGS. 5, 11 and 12. FIG. 5 is a schematic sectional view for explaining a method of adjusting a relative position of an LED array and unmagnified erect image projection lens array according to a conventional art. The conventional art has no function of correcting in the direction Y in its bonding device, and thus has to correct by tilting the lens array at an angle è' with respect to an optical axis A of the lens. To be more specific, the angle è' indicates an angle of the tilt from the central point B. However, if the tilt becomes large, the LED as a light source would displace from the optical axis A, causing a deteriorated image quality. Therefore the present embodiment adopts a structure having a central point of the tilt at a light-emitting point C, so as not to easily undergo a displacement of the optical axis A by the tilt. To be more specific, the angle è indicates an angle of the tilt from the central point C.

FIG. 11 is a detailed illustration of the holding mechanism for the unmagnified erect image projection lens array 20 when an image-forming position is displaced. Let us assume that the image-forming position is displaced from an ideal position by ÄY in an initial state, as shown in FIG. 11. If a distance between the ideal position H where to form an image, and an actual position I where an image is formed is ÄY, it is necessary to tilt the lens by Äè (Äè=2·ÄY/T.C.) in order to correct the position by ÄY. Accordingly, the bonding device 400 moves the moving mechanism 428, so as to move the holding portion 422 apparently in the direction Y (to the right in FIG. 11) by Ä$y_2$ (Ä$y_2$=Äè/$Z_2$–$Z_1$). Such a movement by Ä$y_2$ is accomplished from the central point J, and thus the light-emitting body (LED array) 10 is displaced from the optical axis A of the lens by Ä$y_3$. Therefore, a displacement between the light-emitting body 10 and the optical axis A would occur, whereby an image-forming quality would decrease. Thus, the lens is moved to the right by Ä$y_3$ utilizing the moving mechanism 412 in the direction Y provided in the inventive bonding device 400 and corrected so that the optical axis of the lens may come above the light-emitting body 10.

FIG. 12 is a detailed illustration of a holding mechanism for holding the unmagnified erect image projection lens array 20 when an image-forming position is properly adjusted. The lens array 20 is relatively positioned so that optical axis A may intersect the light-emitting body 10, and an image is formed in an ideal position H, thus it is evident that an image is formed well. As described above, the è-angular correction is made by an operation of the moving mechanism 428 and the moving mechanism 412.

A description will be given of the bonding device 400 of the present invention, with reference to FIGS. 13 and 14. FIG. 13 is a schematic perspective view of another exemplified embodiment of the bonding device 400A. FIG. 14 is an enlarged view of principal part of the bonding device 400A for illustrating an electrical connection portion thereof.

As shown in FIG. 13, the bonding device 400A includes a holding member 410A of the exposure device 100 other than the unmagnified erect image projection lens array 20, a holding member 420A of the unmagnified erect image projection lens array 20, a CCD camera 430A, an actuator 440A, a positioning member 450A between the holding member 410A and the actuator 440A, and the electrical connection portion 460. Since the elements 410A through 450A have generally the same structure and operation as those of the bonding member 400, any description that would overlap the foregoing discussion will be omitted.

The bonding device 400A of the present invention has such a structure that motors 442A through 448A as driving sources are provided in holding member 410A and 420A, and a controller and power source (not shown), and the electrical connection portion 460 are provided in the actuator 440A. Accordingly, joints 414*a* and 425*a* through 429*a* that is provided in the bonding device 400 as power transmission portions are not required, and thus not provided.

A detailed description will be given of the electric connection portion 460, with reference to FIG. 14. For example, the motor 444 is adopted which is used for correcting in the direction Z. The connection portion 460 includes an electrode 462 connected with the motor 444A, an electrode 464 connected with a control circuit 461. The electrode 462 is disposed along an inside of an external wall 466 of the holding member 420A, and connected with the motor 444A. As shown in FIG. 14, the electrode 462 includes a protruded portion having an acute angle, and the protruded portion is configured to hang over outwardly from a clearance of the external wall 466. On the other hand, the electrode 464 is also disposed along an inside of an external wall 468 of the actuator 440A, and is connected with a control circuit 461. Moreover, the electrode 464 has a convex portion to fill in the clearance of the external wall 468. The electrode 462 having a protruded portion is electrically connected by come into contact with the electrode 464. Such a structure may facilitate an attaching/detaching process of the holding members 410A and 420A to/from the actuator 440A.

A description will be given of an operation of the bonding device 400 when the exposure device 100 is manufactured, with reference to the flowchart in FIG. 15. First, the holding member 420 is connected with the actuator 440 (step 1002). Next, the exposure device 100 other than the lens array 20 is fastened to the holding member 410, and connected with the actuator 440 (step 1004). Subsequently, the unmagnified erect image projection lens array 20 is sandwiched by the holding portion 422, and held to keep the state in which the lens array support 30 is fitted (step 1006). The CCD camera 430 for observing how the image is formed is moved to a first position (step 1008). The motor 444 for moving in the direction Z in the actuator 440 is driven, to move the holding member 420, and a position of the lens array 20 is corrected in the direction Z so that a beam of light may be narrowed to the narrowest (step 1010). Then, the motor 442 for moving in the direction Y is driven, and the position of the lens array 20 is corrected in the direction Y so that a beam of light may be narrowed to the narrowest (step 1012). Further, the motor 448 for tilting at the angle è is driven, and the position of the lens array 20 is corrected so that dots for forming an image may be placed in line (step 1014). The number of measurements made by the CCD camera 430 is checked (step 1016). If the number is four or less, the process goes to step 1018, while the number is five, then follows step 1020. As described above, if the number is four or less, the CCD camera 430 is moved to the next position (step 1018), and then the process goes to step 1010. If the number is five, an adhesive is inpoured between the support 30 and the unmagnified erect image projection lens array 20 (step 1020), and the holding member 420 is detached from the actuator 440 (step 1022). Thereafter, the actuator 440 is connected with another holding member 420a (step 1024). The exposure device 100 in which the adhesive is inpoured is left alone until the adhesive is cured (step 1026), and then the exposure device 100 that has been finished is detached from the holding member 410 (step 1028). Through the process to step 1028, one exposure device 100 is manufactured.

The development device 230 serves to visualize a latent image formed on the photosensitive drum 210 into a toner image. The development device 230 includes a development roller 232, a reset roller 234, and a toner cartridge 236. In the present embodiment, toner of four colors such as cyan (C), magenta (M), yellow (Y), and black (K) is used for a developer as an example. The developer may include one or two components (i.e., it may include a carrier) without distinction as to whether it is magnetic or nonmagnetic. The toner cartridge 236 stores toner and supplies toner to the reset roller 234. The reset roller 234 comes into contact with the development roller 232, and supplies toner to the development roller 232. The reset roller 234 is placed in or out of contact with the photosensitive drum 210, and supplies toner to the photosensitive drum 210 by electrostatic force. Consequently, a toner image is formed on the photosensitive drum 210. Unused toner remaining on the development roller 232 is collected by the reset roller 234 and brought back into the toner cartridge 236.

The transfer roller 240 generates an electronic field to electrostatically adsorb toner, and transfers the toner image adsorbed on the photosensitive drum 210 onto the paper P.

After the transfer, the cleaning section 250 collects and disposes of toner remaining on the photosensitive drum 210, or as necessary returns the toner collected by the screw conveyor 260 to the toner cartridge 236. The cleaning section 250 also serves to collect debris on the photosensitive drum. The cleaning section 250 may utilize varied kinds of means including magnetic force and rubber friction to remove the toner and charges on the photosensitive drum 210.

The fixer 330 serves to permanently fix a toner image (toner layer) onto the paper P. The transferred toner is adhered onto the paper P only with a weak force, and thus easily fallen off. Therefore, the fixer 330 fuses the toner by pressure and heat to imbue the paper P with the toner. Energy for fixing the toner layer required to form a multicolor image is greater than that required to form a single-color image. The stacker 342 provides a space for dispensing the paper P after printing is completed.

To illustrate an action of the multicolor image-forming device 300 of the present invention, a sheet placed on the top of one or more sheets of paper P in the hopper 312 is dispensed by the pickup roller 314, and guided by the sheet guide 316 to the conveyor path 342. Thereafter, the paper P is conveyed by the sheet feed roller 322, the conveyor belt 342, and the driven roller 326 to image-forming devices 200*d,* 200*c,* 200*b,* and 200*a* in this sequence, to form toner layers of yellow, magenta, cyan, and black in this sequence according to a desired image. Subsequently, the toner layers are fixed onto the paper P by the fixer 330. The paper P on which the toner is fixed is dispensed to the stacker 344.

Although the preferred embodiments of the present invention have been described above, various modifications and changes may be made in the present invention without departing from the spirit and scope thereof.

As described above, according to the manufacturing device and method of the exposure device as one exemplified embodiment of the present invention, a high-performance development device, and consequently high-quality image can be obtained. In addition, the manufacturing device and method of the exposure device as one exemplified embodiment of the present invention can reduce whole manufacturing time by reducing or eliminating its quiescent time, and can thereby manufacture the product at low cost.

What is claimed is:

1. A manufacturing method of an exposure device including a light source and an unmagnified erect image projection lens array, said manufacturing method comprising the steps of:

providing said light source for use with said exposure device on a first holding member connected with an actuator;

providing said unmagnified erect image projection lens array for use with said exposure device on a second holding member connected with said actuator;

positioning said unmagnified erect image projection lens array relative to said light source by driving said actuator;

bonding said unmagnified erect image projection lens array onto a lens array support; and detaching at least one of said first and second holding members from said actuator.

2. A manufacturing method according to claim 1, further comprising the step of connecting a new holding member with said actuator in place of said first and/or second holding members that have been detached in said detaching step.

3. A manufacturing method of an exposure device including a light source and an unmagnified erect image projection lens array, said manufacturing method comprising the steps of:

providing said light source for use with said exposure device on a first holding member connected with an actuator;

providing said unmagnified erect image projection lens array for use with said exposure device on a second holding member connected with said actuator;

positioning said unmagnified erect image projection lens array relative to said light source by driving said actuator in such a manner as to displace one of said first and second holding members with respect to the other at least in three directions.

4. A manufacturing method according to claim 1, wherein said positioning step is performed while a CCD camera is moved along at least a part of longitudinal direction of said unmagnified erect image projection lens array to observe images formed by said unmagnified erect image projection lens array.

5. A manufacturing method according to claim 1, wherein said positioning step includes a step of displacing one of said first and second holding members in a direction parallel to an optical axis of said unmagnified erect image projection lens array.

6. A manufacturing method according to claim 1, wherein said positioning step includes a step of displacing one of said first and second holding members in a direction perpendicular to both an optical axis and a longitudinal direction of said unmagnified erect image projection lens array.

7. A manufacturing method according to one of claim 1, wherein said positioning step includes a step of tilting one of said first and second holding members with respect to the other.

8. A manufacturing method according to one of claim 1, wherein said positioning step includes a step of tilting said unmagnified erect image projection lens array with respect to said light source.

9. A manufacturing device of an exposure device including a light source and an unmagnified erect image projection lens array, said manufacturing device comprising:

a first holding member that holds said light source in said exposure device;

a second holding member that holds said unmagnified erect image projection lens array in said exposure device; and an actuator that is connected with said first and second holding members and moves at least one of said first and second holding members to position said unmagnified erect image projection lens array relative to said light source, wherein at least one of said first and second holding members can be attached to and detached from said actuator.

10. A manufacturing device according to claim 9, wherein said first holding member can be attached to and detached from said actuator while holding said light source.

11. A manufacturing device according to claim 9, wherein said second holding member can be attached to and detached from said actuator while holding said unmagnified erect image projection lens array.

12. A manufacturing device of an exposure device including a light source and an unmagnified erect image projection lens array, said manufacturing device comprising:

a first holding member that holds said light source in said exposure device;

a second holding member that holds said unmagnified erect image projection lens array in said exposure device;

a correction mechanism that may displace one of said first and second holding members with respect to the other at least in three directions; and an actuator that is connected with said first and second holding members and drives said correction mechanism to position said unmagnified erect image projection lens array relative to said light source.

13. A manufacturing device according to claim 12, wherein said correction mechanism may displace one of said first and second holding members in a direction parallel to an optical axis of said unmagnified erect image projection lens array.

14. A manufacturing device according to claim 12, wherein said correction mechanism may displace one of said first and second holding members in a direction perpendicular to both an optical axis and a longitudinal direction of said unmagnified erect image projection lens array.

15. A manufacturing device according to claim 12, wherein said correction mechanism may tilt one of said first and second holding members with respect to the other.

16. A manufacturing device according to claim 12, wherein said correction mechanism may tilt said unmagnified erect image projection lens array with respect to said light source.

17. A manufacturing device according to claim 9, further comprising a CCD camera that is connected movably with said actuator in at least a part of longitudinal direction of said unmagnified erect image projection lens array and observes images formed by said unmagnified erect image projection lens array.

18. A manufacturing device according to claim 9, wherein said actuator is integrated with said first and/or second holding members.

19. A manufacturing device of an exposure device including a light source and an unmagnified erect image projection lens array, said manufacturing device comprising:

a first holding member that holds said light source in said exposure device;

a second holding member that holds said unmagnified erect image projection lens array in said exposure device;

a correction mechanism that may displace one of said first and second holding members in a direction perpendicular to both an optical axis and a longitudinal direction of said unmagnified erect image projection lens array; and an actuator that is connected with said first and second holding members and drives said correction mechanism to position said unmagnified erect image projection lens array relative to said light source.

* * * * *